(12) United States Patent
Liao et al.

(10) Patent No.: US 6,599,385 B1
(45) Date of Patent: Jul. 29, 2003

(54) MANUFACTURING METHOD OF A MULTI-LAYER OPTICAL INFORMATION RECORDING CARRIER

(75) Inventors: Wen-Yih Liao, Taichung (TW); Der-Ray Huang, Hsinchu (TW); Tzuan-Ren Jeng, Hsinchu (TW); Chien-Liang Huang, Taoyuan (TW); Huei-Wen Yang, Chungli (TW); Po-Fu Yen, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 31 days.

(21) Appl. No.: 09/704,402

(22) Filed: Oct. 31, 2000

(51) Int. Cl.[7] .............................. G11B 7/26; G11B 5/84; B32B 31/00; B32B 31/04
(52) U.S. Cl. .................... 156/272.2; 156/230; 156/232; 156/240; 156/241; 156/247; 156/182; 427/146; 427/164; 428/64.7; 369/275.1; 369/283
(58) Field of Search .............................. 369/275.1, 283; 427/146, 164; 156/272.8, 230, 232, 240, 241, 247, 182, 289, 272.2; 428/64.7, 64.4

(56) References Cited

U.S. PATENT DOCUMENTS

| | | | | |
|---|---|---|---|---|
| 5,726,969 A | * | 3/1998 | Moriya et al. | 369/275.1 |
| 5,838,506 A | * | 11/1998 | Tomono et al. | 156/233 |
| 6,168,682 B1 | * | 1/2001 | Bennett et al. | 156/295 |
| 6,309,496 B1 | * | 10/2001 | Van Hoof | 156/230 |

* cited by examiner

Primary Examiner—Michael W. Ball
Assistant Examiner—Justin Fischer
(74) Attorney, Agent, or Firm—Birch, Stewart, Kolasch & Birch, LLP

(57) ABSTRACT

A manufacturing method of a multi-layer optical information record carrier, which has a plurality of layers of reflecting surfaces with pits for recording information. According to the method, a reflective layer is first coated on a stamper with a pit pattern. A radiation-setting adhesive polymer resin is then applied on a substrate with another pit pattern and coated with a partial reflective layer. The substrate and the stamper are combined together and the resin is cured by ultraviolet light. After peeling off the stamper, two reflective layers are formed on the substrate. Finally, two of the substrates are adhered together using polymer resin and one obtains a multi-layer optical information record carrier with dual information layers on both sides.

16 Claims, 6 Drawing Sheets

US 6,599,385 B1

MANUFACTURING METHOD OF A MULTI-LAYER OPTICAL INFORMATION RECORDING CARRIER

BACKGROUND OF THE INVENTION

1. Field of Invention

The present invention relates to a manufacturing method of an optical information record carrier and, more particularly, to a manufacturing method of an optical information record carrier that has a plurality of layers of reflective layers recorded with information, such as a dual-layer dual-side optical disk.

2. Related Art

An optical disk is a storage medium that records data signals in the form or recess and protrusion portions/pits. Since the optical disk has a high data storage density, the data access is in a non-contact way and the stored data can last for a longer time, thus it is widely used in storing voice, video images and large-size software. The conventional optical disk (e.g. CD) has only a one side and one layer. A CD with a diameter of 12 centimeters has a capacity of about 650MB. The read-only memory type digital versatile disks (DVD-ROM) introduced in recent years have the following four specifications: one side and dual layers, one side and one layer, dual surfaces and one layer, and dual surfaces and dual layers. For a DVD-ROM with a diameter of 12 centimeters, the dual-layer dual-side disk has a capacity of 4.7GB (DVD-5), and the dual-layer dual-side one has a capacity of 17GB (DVD-18). Currently, DVD-5 (4.7GB), DVD-9 (8.5GB) and DVD-10 (9.4GB) are available on the market, yet there is no commercialized DVD-18 (17GB) available mainly because of the bottleneck difficulty in the manufacturing process.

The usual manufacturing process of the dual-layer dual-side DVD-ROM is to adhere two dual-layer one-side data recording substrates 10 of 0.6mm thick together, as shown in FIGS. 4a and 4b. One substrate 10 has a first reflective layer 11 and a second reflective layer 12 on one surface with a transparent polymer resin layer 12 in between. The first reflective layer 11 and the second reflective layer 12 are reflecting surfaces that have data pit patterns in recess and protrusion portions. The first reflective layer 11 can be a partial reflective layer made of, for example, Au or Si; the second reflective layer 12 can be a total reflective layer made of Al. Therefore, the data stored on these two layers can be accessed from the other surface of the substrate using an optical read/write device. Adhering the two double-layer data recording substrates 10 by an adherent 14 placed between the second reflective layers 12 of the two substrates 10, one then gets a dual-layer dual-side optical disk.

To make a dual-layer dual-side DVD-ROM, the currently available technologies to form a plurality of data recording layers on a substrate include: the injection molding method, the photo polymer (2P) method and the spin-on and peel (SOAP) method.

Two pieces of stampers etched with signals are disposed at the fixed surface and mobile surface of an injection cavity, respectively. A high temperature and a high pressure are imposed to press a plastic material (e.g. polycarbonate) into the cavity. The male mold (mobile surface) and the female mold (fixed surface) of the cavity are provided with stampers etched with pit patterns, thus forming a thin film with pit patterns on both surfaces. Once a reflective layer is formed on the thin film, it is adhered onto an optical disk substrate. This method requires high temperatures and high pressures and thus has serious erosion on the stampers. Further, the thickness of the thin film made by the injection molding has its lower limit, thus no ultra-thin films can be made. Moreover, thermal stress and inhomogeneous contraction of the plastic often cause distortions of the products so that they do not satisfy the standard and lower the product yield.

The 2P method first coats a layer of highly plastic polymer resin on a stamper. A high pressure is imposed to press the polymer resin against the stamper to copy the pit pattern on the stamper onto the polymer resin. The polymer resin layer is then cured by ultraviolet (UV) light to form a thin film with a pit pattern. This cured thin film is adhered onto another substrate that is etched with a pit pattern and coated with a partial reflective layer, the surface with the pit pattern being facing outward. A total reflective layer is formed on the thin polymer film to form a disc with a dual-layer one-side optical disk. If the total reflective surfaces of two such dual-layer one-side substrates are adhered together face to face, a dual-layer dual-side optical disk can be obtained, such as a DVD-18. The defect of this method is that it needs a high pressure in order to obtain a good pit pattern copy, which will causes serious erosion of the stamper. It is hard to control the yield in the technology of combining the thin film and the substrate due to bubbles and wrinkles.

The SOAP method drops a polymer resin solution onto a spinning stamper so as to spin-coat the polymer resin solution homogeneously over the whole stamper. When the solution vaporizes, a layer of cured thin film with a pit pattern is formed. This thin film is then adhered onto a substrate with a pit pattern surface and a partial reflective layer, the surface with the pit pattern being facing outward. A dual-layer one-side disk is formed by further coating a total reflective layer. A dual-layer dual-side disk is formed by combining two pieces of the dual-layer one-side optical disks with the two total reflective surfaces adhered face to face. This method, however, still needs a process for combining the thin film and the substrate in which bubbles and wrinkles are likely to be produced to lower the yield.

To solve the problems of serious erosion of the stamper and the low yield in the above methods, it is desirable to provide a new manufacturing method.

SUMMARY OF THE INVENTION

It is a primary object of the present invention to provide a method for manufacturing an optical information record carrier that can reduce the erosion of the stamper and increase the yield.

Pursuant to the above object, the disclosed method directly forms a reflective layer on a stamper. A radiation setting resin is then employed to adhere a substrate with a pit pattern and a partial reflective layer onto the stamper. This method eliminates the step of making a thin film and adhering the thin film onto the substrate, thus avoiding the problems with bubbles and wrinkles.

The radiation setting resin in the method is applied by spin coating without high temperature and pressure. Therefore, erosion on the stamper is reduced and there is no such problem of distortion due to thermal stress and residual stress.

One disclosed manufacturing method of an optical information record carrier comprises the steps of: forming a first reflective layer on a stamper with a first pit pattern; coating a radiation setting resin layer on the first reflective layer of the stamper; providing a substrate whose one surface is provided with a second pit pattern and coated with a second reflective layer; adhering the surface of the substrate to the stamper with the resin layer being between the substrate and the stamper; radiating and curing the resin layer using a light beam; peeling the stamper off from the first reflective layer; and adhering the surface with the reflective layer of the substrate to that of another substrate.

Another disclosed manufacturing method of an optical information record carrier comprises the steps of forming a first reflective layer on a stamper with a first pit pattern; providing a substrate whose one surface is provided with a second pit pattern and coated with a second reflective layer; coating a radiation setting resin layer on the second reflective layer of the substrate; adhering the surface of the substrate to the first reflective layer of the stamper with the resin layer; radiating and curing the resin layer using a light beam; peeling the stamper off from the first reflective layer; and adhering the surface with the reflective layer of the substrate to that of another substrate.

Other features and advantages of the present invention will be apparent from the following detailed description, which proceeds with reference to the accompanying drawings.

BRIEF DESCRIPTION OF THE DRAWINGS

In the various drawings, the same references relate to the same elements.

DETAILED DESCRIPTION OF THE INVENTION

Figure 1A:
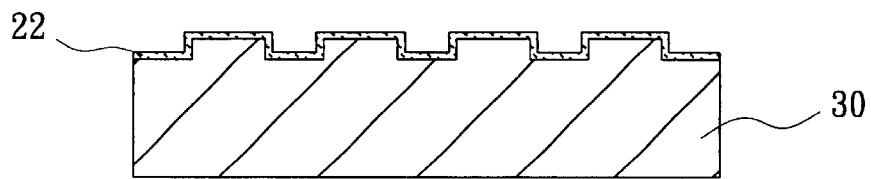
FIGS. 1a through 1f are cross sectional views of the first preferred embodiment manufacturing process according to the disclosed method of making an optical disk.

FIGS. 1a through 1f show a first preferred embodiment of the invention. As shown in FIG. 1a, a second reflective layer 22, such as a aluminum, gold, silver or silicon total reflective layer of 60 nm thick, is coated on the top surface of a stamper 30 by the vapor phase deposition method, evaporation or sputtering. The stamper 30 can be made of metal or polymer, such as, nickel, PC or PMMA. The top surface is preformed with a pit pattern with recess and protrusion portions. The second reflective layer 22 is then copied with the same pit pattern as the stamper 30.

Figure 1B:
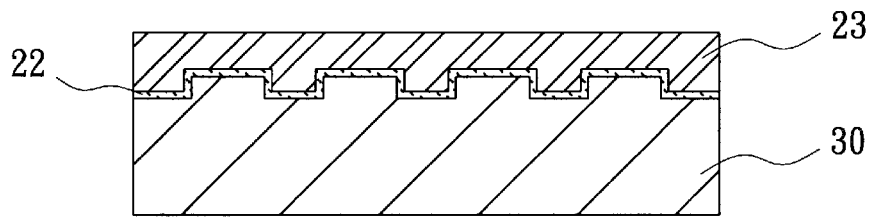

As shown in FIG. 1b, the second reflective layer 22 on the stamper 30 is coated with a layer of radiation setting adhesive polymer resin layer 23. The resin layer 23 coating can be controlled to have a thickness between 40 μm and 65 μm by spin coating.

Figure 1C:
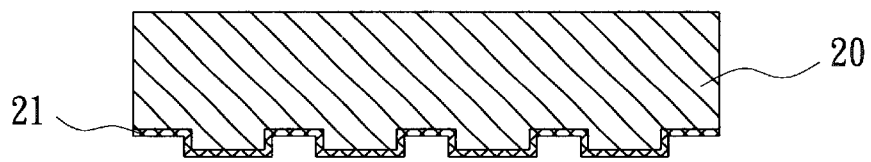
Figure 1C:
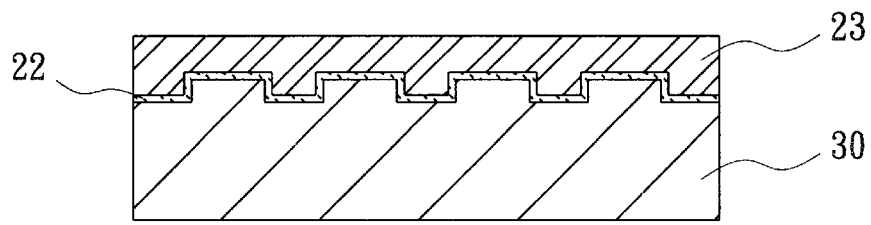

As shown in FIG. 1c, a substrate 20 of 0.6 mm thick is provided with one surface being preformed with a pit pattern and a first reflective layer 21 coated thereon. The first reflective layer 21 can be a partial reflective layer of gold, silver or silicon with a thickness of 18 nm. The substrate 20 can be made of PMMA or polycarbonate (PC) by injection molding in a conventional way.

Figure 1D:
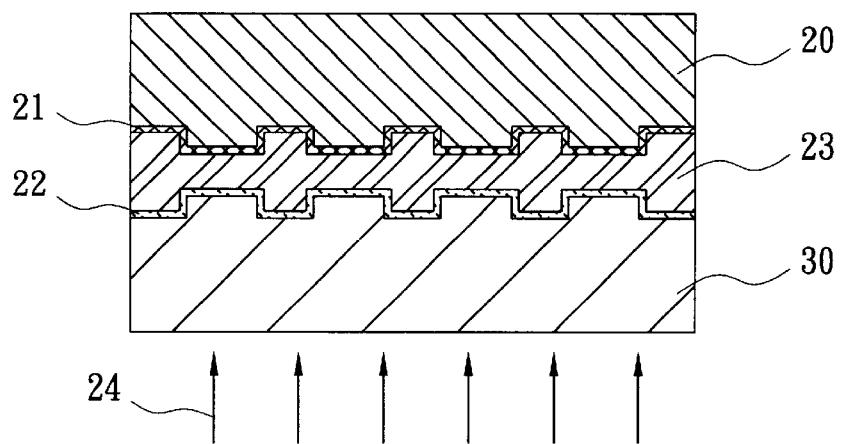
Figure 1E:
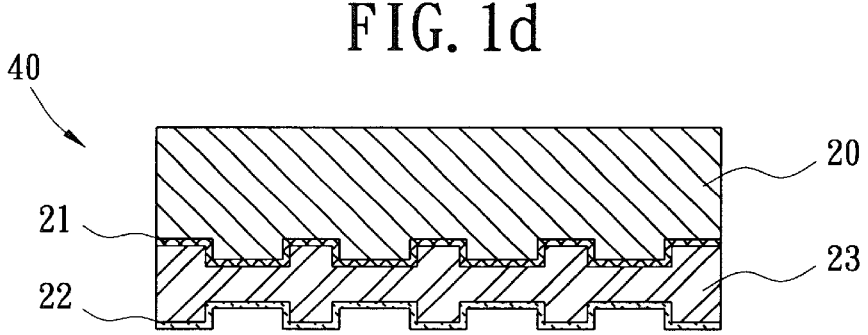

As shown in FIG. 1d, the surface with the pit pattern of the substrate 20 is adhered to the top surface of the stamper 30 and the resin layer 23 is between the first reflective layer 21 and the second reflective layer 22. The resin layer 23 is radiated by ultraviolet (UV) light 24 to be cured. The stamper 30 is then peeled off. Since the adhesive force between the second reflective layer 22 and the stamper 30 is smaller than that between the second reflective layer 22 and the cured resin layer 23. As shown in FIG. 1e, the substrate 20 is formed with two layers of reflective layers 21, 22 with pit patterns. This is a dual-layer one-side optical disk 40.

Figure 1F:
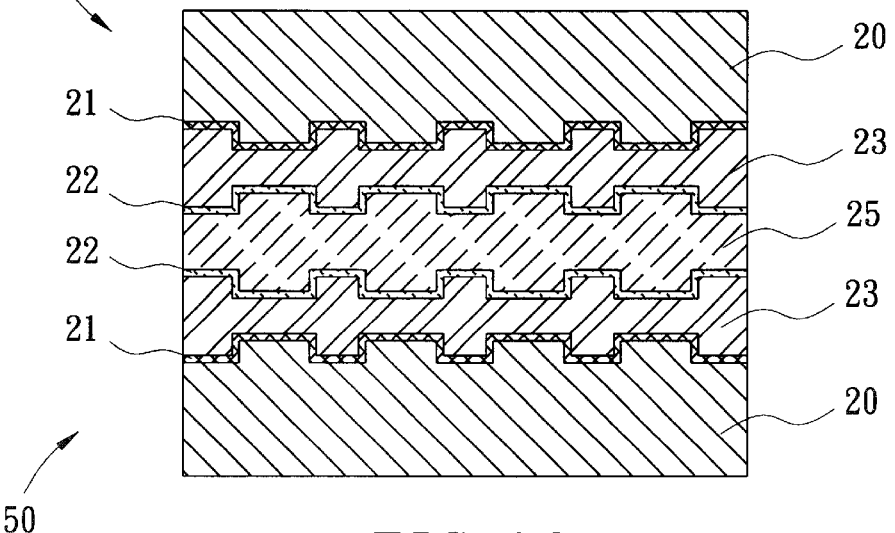

Finally, as shown in FIG. 1f, the dual-layer one-side optical disk 40 is glued with another 50 with the two reflective layers 22 facing each other using an adherent 25. This gives a dual-layer dual-side optical disk.

FIGS. 2a through 2g show the second preferred embodiment of the invention. As in FIG. 2a, a second reflective layer 22, such as a aluminum, gold, silver or silicon total reflective layer of 80 nm thick, is coated on the top surface of a stamper 30 by the vapor phase deposition method, evaporation or sputtering. The stamper 30 can be made of metal or polymer, such as, nickel, PC or PMMA. The top surface is preformed with a pit pattern with recess and protrusion portions. The second reflective layer 22 is then copied with the same pit pattern as the stamper 30.

Figure 2A:
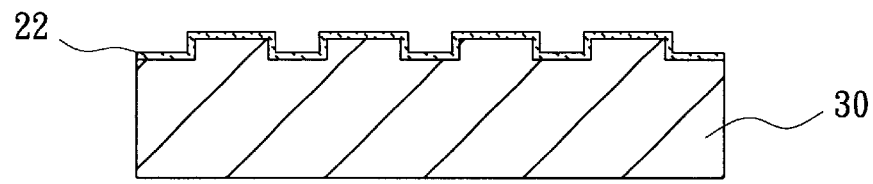
FIGS. 2a through 2g are cross sectional views of the second preferred embodiment manufacturing process according to the disclosed method of making an optical disk.
Figure 2B:
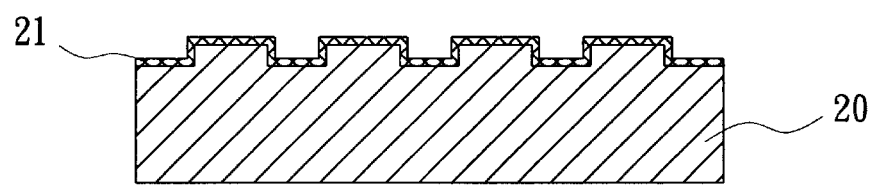

As shown in FIG. 2b, a substrate 20 of 0.6 mm thick is provided with one surface being preformed with a pit pattern and a first reflective layer 21 coated thereon. The first reflective layer 21 can be a partial reflective layer-of gold, silver or silicon with a thickness of 10 nm. The substrate 20 can be made of PMMA or polycarbonate (PC) by injection molding in a conventional way.

Figure 2C:
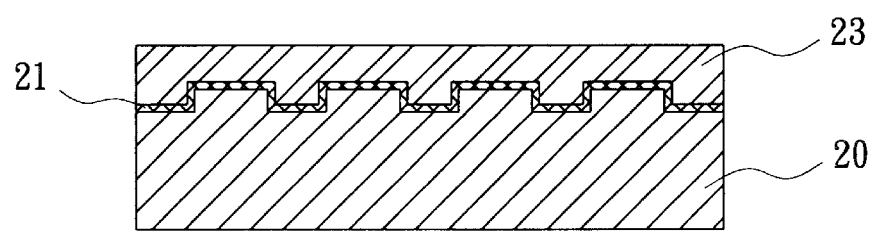

As shown in FIG. 2c, the first reflective layer 21 on the substrate 20 is coated with a layer of radiation setting adhesive polymer resin layer 23. The resin layer 23 coating can be controlled to have a thickness between 40 μm and 65 μm by spin coating.

Figure 2D:
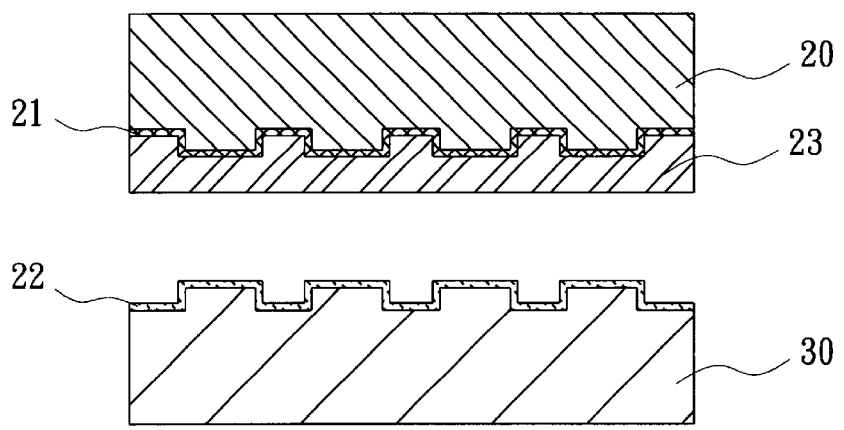

As shown in FIG. 2d, the first reflective layer 21 of the substrate 20 coated with the resin layer 23 is adhered to the top surface of the stamper 30 and the resin layer 23 is between the first reflective layer 21 and the second reflective layer 22.

Figure 2E:
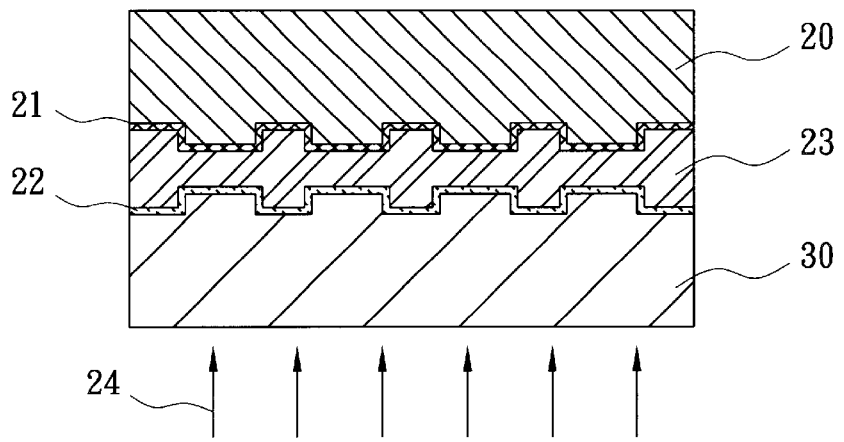
Figure 2F:
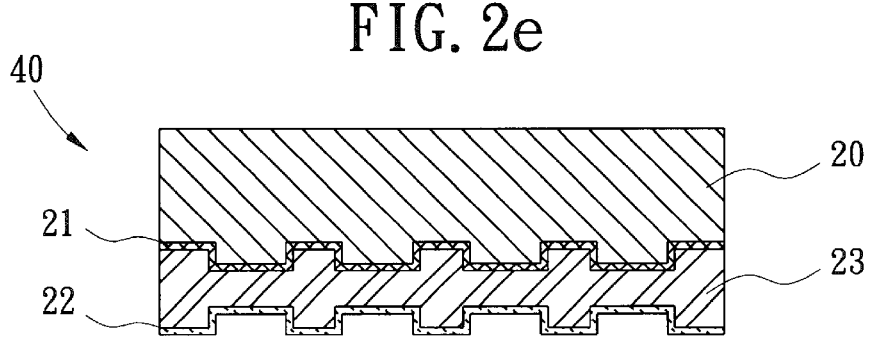

As shown in FIG. 2e, the resin layer 23 is radiated by ultraviolet (UV) light 24 to be cured. The stamper 30 is then peeled off. Since the adhesive force between the second reflective layer 22 and the stamper 30 is smaller than that between the second reflective layer 22 and the cured resin layer 23. As shown in FIG. 2f, the substrate 20 is formed with two layers of reflective layers 21, 22 with pit patterns. This is a dual-layer one-side optical disk 40.

Figure 2G:
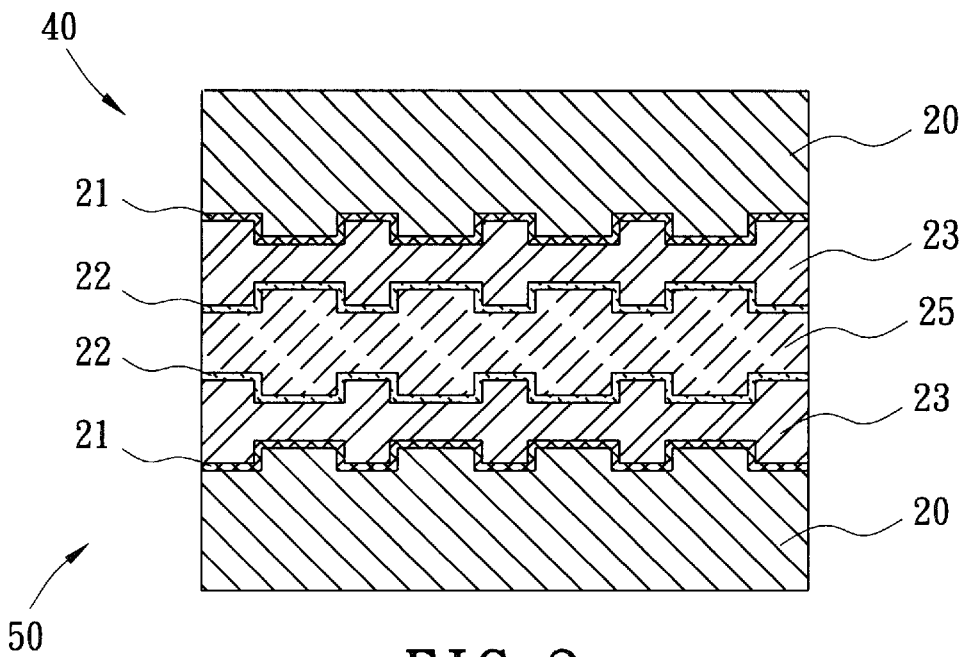

Finally, as shown in FIG. 2g, the dual-layer one-side optical disk 40 is glued with another 50 with the two reflective layers 22 facing each other using an adherent 25. This gives a dual-layer dual-side optical disk.

Figure 3:
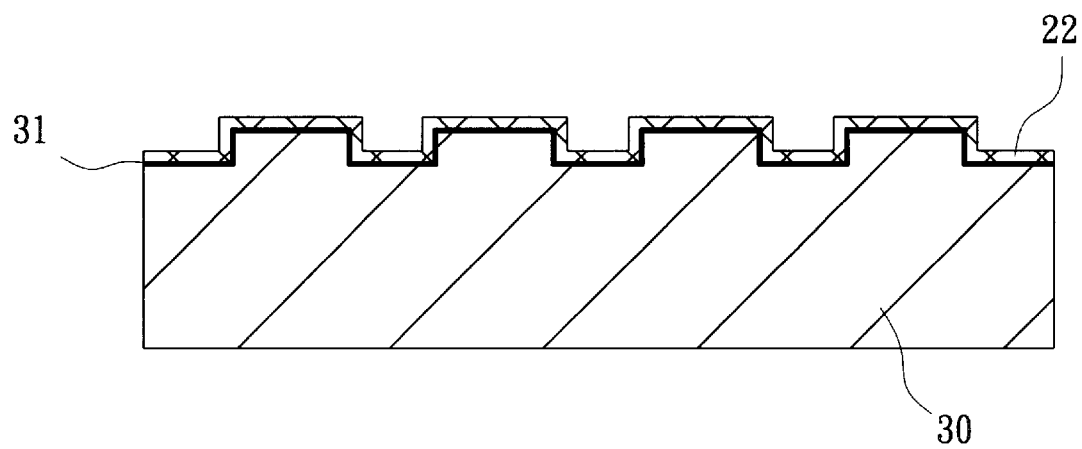
FIG. 3 depicts a cross sectional view of a stamper wherein the stamper is first coated with an ultra-thin stamper-peeling solution and then a reflective layer.
Figure 4A:
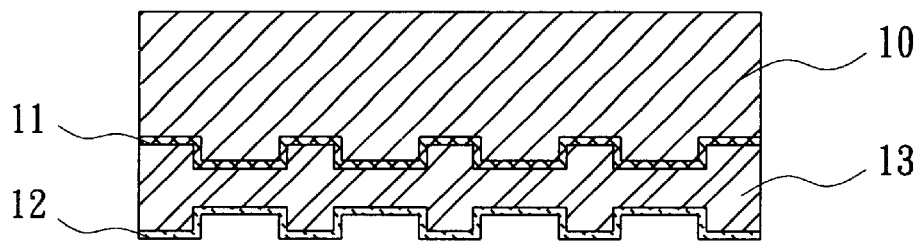
FIGS. 4a and 4b are cross sectional views showing the formation of a dual-layer dual-side optical disk by adhering two dual-layer one-side optical disks together with the reflective layers facing each other.
Figure 4A:
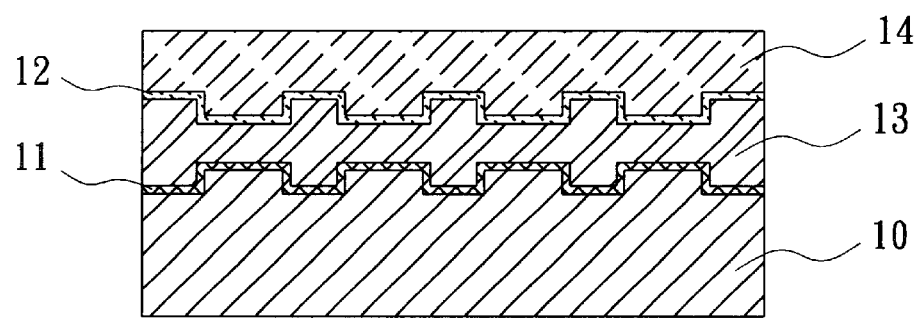
Figure 4B:
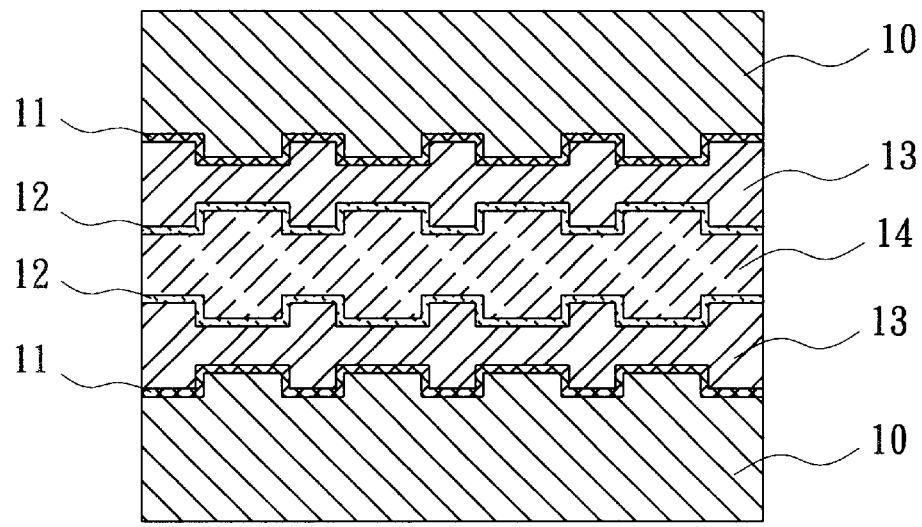

In the above two embodiments, the step of peeling off the stamper 30 from the second reflective layer 22 uses the property that the adhesive force between the second reflective layer 22 and the stamper 30 is smaller. However, to make the separation of the second reflective layer 22 and the stamper 30 easier, an ultra-thin stamper-peeling solution 31 can be coated on the stamper 30 before coating the second reflective layer 22 on the stamper 30, as shown in FIG. 3.

Although the invention has been described with reference to specific embodiments, this description is not meant to be construed in a limiting sense. Various modifications of the disclosed embodiments, as well as alternative embodiments, will be apparent to persons skilled in the art. For example, the substrate can have a different thickness, such as 1.2 mm, 0.5 mm, 0.3 mm, for other purposes. The thickness and material of the first reflective layer and the second reflective layer can have other choices. For instance, the material can be aluminum, silver, gold, copper, chromium or silicon or their alloy. The radiation setting adhesive resin layer can have a different thickness, e.g. 10 μm to 80 μm, according to the need. It is, therefore, contemplated that the appended claims will cover all modifications that fall within the true scope of the invention.

What is claimed is:

1. A manufacturing of a multi-layer optical information record carrier, which comprises the steps of:

forming a second reflective layer on a stamper with a second pit pattern, wherein the stamper is made of nickel;

coating a radiation setting resin layer on the second reflective layer of the stamper;

providing a substrate whose one surface is provided with a first pit pattern and coated with a first reflective layer;

adhering the surface of the substrate to the stamper with the resin layer being between the substrate and the stamper;

radiating and curing the resin layer using a light beam; and peeling the stamper off from the second reflective layer.

2. The method of claim 1 further comprising the step of coating a stamper-peeling solution on the stamper before the step of forming the second reflective layer.

3. The method of claim 1 further comprising the step of adhering the substrate to another said substrate with the reflective layers facing each other after the step of peeling the stamper off from the second reflective layer.

4. The method of claim 1, wherein the step of coating a radiation setting resin layer on the second reflective layer of the stamper is done by spin coating.

5. The method of claim 1, wherein the material of the second reflective layer is selected from the group comprising aluminum, silver, gold, copper, chromium, silicon and their alloys.

6. The method of claim 1, wherein the material of the first reflective layer is selected from the group comprising silver, gold, and silicon.

7. The method of claim 1, wherein the thickness of the radiation setting adhesive resin layer ranges from 10 μm to 80 μm.

8. The method of claim 1, wherein the thickness of the substrate ranges from 0.1 mm to 1.2 mm.

9. A manufacturing of a multi-layer optical information record carrier, which comprises the steps of:

forming a second reflective layer on a stamper with a second pit pattern, wherein the stamper is made of nickel;

providing a substrate whose one surface is provided with a first pit pattern and coated with a first reflective layer;

coating a radiation setting resin layer on the second reflective layer of the stamper;

adhering the first reflective layer of the substrate to the second reflective layer of the stamper with the resin layer being between the first reflective layer and the second reflective layer;

radiating and curing the resin layer using a light beam; and peeling the stamper off from the second reflective layer.

10. The method of claim 9 further comprising the step of coating a stamper-peeling solution on the stamper before the step of forming the second reflective layer.

11. The method of claim 9 further comprising the step of adhering the substrate to another said substrate with the reflective layers facing each other after the step of peeling the stamper off from the second reflective layer.

12. The method of claim 9, wherein the step of coating a radiation setting resin layer on the second reflective layer of the stamper is done by spin coating.

13. The method of claim 9, wherein the material of the second reflective layer is selected from the group comprising aluminum, silver, gold, copper, chromium, silicon and their alloys.

14. The method of claim 9, wherein the material of the first reflective layer is selected from the group comprising silver, gold, and silicon.

15. The method of claim 9, wherein the thickness of the radiation setting adhesive resin layer ranges from 10 μm to 80 μm.

16. The method of claim 9, wherein the thickness of the substrate ranges from 0.1 mm to 1.2 mm.

* * * * *